US007393396B2

(12) United States Patent
Lehmann et al.

(10) Patent No.: US 7,393,396 B2
(45) Date of Patent: Jul. 1, 2008

(54) PROCESS FOR PRODUCING HOMOGENEOUS AND STORAGE-STABLE PASTES, INKS AND PAINTS USING IONIC LIQUIDS AS DISPERSING ADDITIVES

(75) Inventors: Kathrin Lehmann, Leverkusen (DE); Stefan Silber, Krefeld (DE); Bernd Weyershausen, Essen (DE)

(73) Assignee: Goldschmidt GmbH, Essen (DE)

( * ) Notice: Subject to any disclaimer, the term of this patent is extended or adjusted under 35 U.S.C. 154(b) by 298 days.

(21) Appl. No.: 11/058,803

(22) Filed: Feb. 16, 2005

(65) Prior Publication Data

US 2005/0183628 A1    Aug. 25, 2005

(30) Foreign Application Priority Data

Feb. 20, 2004   (EP) .................................. 04003922

(51) Int. Cl.
    C09D 11/00    (2006.01)
(52) U.S. Cl. .............. 106/31.13; 106/31.75; 106/31.76; 106/31.77; 106/31.78; 106/499
(58) Field of Classification Search .............. 106/31.13, 106/31.43, 31.46, 31.47, 31.49, 31.75, 31.76, 106/31.77, 31.78, 499
    See application file for complete search history.

(56) References Cited

U.S. PATENT DOCUMENTS

| 3,980,602 | A   |   | 9/1976  | Jakubauskas |            |
|-----------|-----|---|---------|-------------|------------|
| 5,853,469 | A   | * | 12/1998 | Colt et al. | 106/31.49  |
| 5,976,231 | A   | * | 11/1999 | Schwarz     | 106/31.43  |
| 6,048,388 | A   | * | 4/2000  | Schwarz     | 106/31.27  |
| 6,451,098 | B1  | * | 9/2002  | Lye et al.  | 106/31.47  |
| 6,531,273 | B1  | * | 3/2003  | Olson et al.| 430/543    |
| 6,573,405 | B1  | * | 6/2003  | Abbott et al.| 564/292   |
| 6,942,957 | B2  | * | 9/2005  | Ray et al.  | 430/271.1  |
| 2004/0035293 | A1 | * | 2/2004 | Davis       | 95/140     |
| 2006/0100323 | A1 | * | 5/2006 | Schmidt et al.| 524/106  |
| 2006/0139426 | A1 | * | 6/2006 | Doi         | 347/100    |

FOREIGN PATENT DOCUMENTS

| DE | 44 16 336 A1 | 11/1995 |
| EP | 0 311 157 B1 | 4/1989 |
| EP | 0 731 148 A2 | 9/1996 |
| WO | WO 94/18260 | 8/1994 |
| WO | WO 94/21701 | 9/1994 |
| WO | WO2004/005391 | * 1/2004 |

OTHER PUBLICATIONS

J. Bieleman, PPCJ 3, 17, Mar. 1995.
6th Nurnberg Congress, "Creative Advances in Coatings Technology", Apr. 2001, 481, Vincentz KG.

(Continued)

*Primary Examiner*—Helene Klemanski
(74) *Attorney, Agent, or Firm*—Scully, Scott, Murphy & Presser, P.C.

(57) ABSTRACT

The invention provides a process for producing homogeneous and storage-stable pastes, inks, paints, coverings, coatings and coating materials which comprises using ionic liquids as dispersing additives.

13 Claims, 1 Drawing Sheet

OTHER PUBLICATIONS

P. Schoberl, et al., "Tenside Surfactants Detergents", 25, 1988, 2, 86, no month available.

K. R. Seddon, School of Chemistry, The Queen's University of Belfast, "Ionic Liquids for Clean Technology", J. Chem. Tech. Biotechnol. 1997, 68, 351-356, no month available.

Alison C. Nimrod, et al., Department of Pharmacology and Environmental Toxicology Research Program, "Environmental Estrogenic Effects of Alkylphenol Ethoxylates", Critical Reviews in Toxicology, 26(3): 335-364 (1996), no month.

* cited by examiner

PROCESS FOR PRODUCING HOMOGENEOUS AND STORAGE-STABLE PASTES, INKS AND PAINTS USING IONIC LIQUIDS AS DISPERSING ADDITIVES

FIELD OF THE INVENTION

The present invention relates to a process for producing homogeneous and storage-stable pastes, inks and paints comprising fillers and/or pigments, using ionic liquids as dispersing additives, and to ionic liquids comprising dispersing additives.

BACKGROUND OF THE INVENTION

The use of dispersants to disperse fillers and pigments in liquid media is state of the art and involves, in principle, using such additives to fullfill the following tasks:

(1) An easier incorporation of fillers and pigments, in order to ensure shorter dispersing times at plant level or to allow the utilization of simple dispersing equipment (dissolvers rather than beadmill dispersing),
(2) A reduction in the viscosity of pigment pastes or of inks and paints, absent which the production of very highly filled pigment pastes is completely impossible,
(3) The development of optimum color strength or of optimum hiding power in the case of opaque pigments,
(4) The prevention of the propensity of pigment pastes to undergo settling when stored for a number of months, in transit and under extreme climatic exposure,
(5) The prevention of flocculation in order to produce reproducible shades, which is particularly important as a result of the use of paint-mixing machines for coloring different kinds of white base paints and base varnishes, and
(6) The establishment of compatibility with a large number of letdown binders or, additionally, of paints and inks produced from them.

The fundamental tasks of a dispersant or of such auxiliaries, described above, should first be fed independently of the question of the particular liquid medium in which a filler or pigment is to be dispersed.

In the manner in which the desired effect is achieved, however, dispersants are frequently very variable. It is necessary to consider how independently a dispersant operates from the pigment used, in other words how universally it acts in respect of different kinds of pigment and filler surfaces (organic or inorganic, hydrophobically or hydrophilically modified, etc.).

This function can often still be met by modern-day polymeric dispersant structures. Descriptions are given, for example, of water-soluble polyisocyanate adducts containing hydrophilic polyether chains (EP-A-0 731 148), hydrophilic polyurethane-polyureas (DE-A-44 16 336), poly(meth)acrylates (U.S. Pat. No. 3,980,602, WO-A-94/21701), and also specialty polyesters (WO-A-94/18260) or copolymers based on vinylic monomers (styrene, vinylimidazole, etc.) with acrylate-functional monomers (acrylic cid, BuAc, HEA), as in EP-B-0 311 157.

Besides the disruptive or even toxic residues of monomer, however, these systems frequently lack universal compatibility with the typical binder systems.

Because of molar weight, the nature of the monomers used or the long polyethylene oxide chains that are needed for water solubility, the resulting products are frequently solid and can be formulated by neutralization generally only as 40% strength aqueous solutions, thereby restricting the user in the case where highly concentrated pastes are produced.

A far greater problem, however, is that of the universality of the dispersant for different kinds of surroundings.

The fundamental assumption is that in aqueous, hydrophilic media it is necessary to take account not only of the steric stabilization of the pigment by the dispersant, but also of an electrostatic contribution to stabilization, which, if functional groups are suitably chosen, is not available in this way for dispersing in a solvent-containing environment or in other hydrophobic media such as UV systems.

In the last-mentioned systems, the action of dispersants is primarily through steric stabilization. It is therefore understandable that dispersants must have a certain compatibility with the medium surrounding them in order for there to be the steric stabilization, through the maintenance of sufficient distance between the pigment particles. Those components of dispersants (side chains in polymers and/or block components in linear structures) which take on this stabilizing function are not capable of being able to be equally effective in a hydrophilic and a hydrophobic environment, owing to the stringent requirements imposed on the different kinds of pigments. This is essentially a question of the solubility and compatibility with the surrounding matrix.

It is therefore state of the art today that, owing to the diverse efforts, different kinds of dispersant structures have been developed on one hand for aqueous and water-thinnable paints and inks and, on the other hand, that there are dispersants for solvent-borne and UV-based systems, respectively. In other words, the scheme which has come about (see, FIG. 1 which is referred herein as scheme (1)) is a different kind of color paste system for coloring the aqueous and the solvent-borne systems, respectively, on the basis of the aforementioned dispersant groups.

In light of the associated logistical effort and microeconomic expense involved in producing and storing different kinds of pigment paste systems for paint-mixing machines, there is therefore a high potential for savings, which has already been acknowledged by certain developments in more recent times, through the use of what are called universal dispersants.

So-called universal dispersants are used for formulating aqueous pigment pastes and are formulated, for example, on the basis of alkylphenol ethoxylates (J. Bieleman, PPCJ 3, 1995, 17; P. Quednau, ACT'98, Paper No. 29), oleo-block-ABC derivatives (H. Frommelius, VILF (Verband der Ingenieure für Lacke und Farben) Janrestagung [annual conference] 2000, 41) or styrene-oxide-based polyether structures (6th Nuremberg Congress, Creative Advances in Coatings Technology, April 2001, 481, Vincentz K G). Nevertheless the ecotoxicologically objectional alkylphenol ethoxylates (Journal of Surfactants and Detergents, Vol.5, No.1, (2002); Critical reviews in Toxicology, 26(3): 335-364, (1996); P. Schöberl, Tenside Surfactants Detergents 25, 1988, 2, 86; K. Fent, Swiss Federal Institute for Environmental Science and Technology) are as unsuccessful as the other concepts for universal dispersants for allowing the successful coloring of all existing systems.

When used alone in water-based universal pastes (which can contain up to 20% solvent in the form, for example, of a humectant), they are only capable of tinting aqueous paints and inks, based for example on acrylate dispersions, hybrid binders or PVAc terpolymers, and of coloring a narrowly restricted, selected assortment of solvent-based inks and paints, such as conventional alkyd resin paints or PU alkyd-based systems, for example.

So-called universal pastes are completely unsuitable, however, for coloring solvent-borne paints and inks based, for example, on Pliolite (styrene-acrylates or styrene-butadienes in solution, for example, in white spirit or isoparaffins) or Isopar-based alkyd resins or systems known as high-solids alkyds. Solvent-based pastes have been employed for this function to date.

In view of the fact that in conventional paint-mixing machines there are 12 to 20 color pastes with different pigments, the market's requirement not to have to install a plurality of paint-mixing machines, each containing pastes suitable only for coloring particular white paints and varnishes, becomes clearly understandable.

SUMMARY OF THE INVENTION

It is an object of the present invention to make existing aqueous pigment systems, which to date are totally unsuitable for the coloring of solvent-borne paints, or to make those pigment pastes which, although formulated on the basis of a universal dispersant, are deserving of such a description only to a restricted extent, suitable for use in the aforementioned problematic solvent-borne paint and ink systems.

Their use ought to be possible not only in present-day aqueous pastes or universal paste systems, but also in combination during the coloring of base white paint systems or as wetting agents in base white paints, so as to replace the solvent-borne pastes, which are still used at present for problem systems of this kind, and which also necessitate an additional paint-mixing machine, by the sole use of aqueous pastes or universal pastes.

Surprisingly it has been found by the applicants that through the use of ionic liquids in the aqueous pastes or universal pastes as secondary dispersants or through their use in the white paint or their use as a third component during coloring (paste+white paint+ionic liquid) it is possible to overcome the aforementioned problem in such systems.

The present invention accordingly first provides a process for producing homogeneous and storage-stable pastes, inks, paints, coverings, coatings and coating materials which comprise at least one ionic liquid as a dispersing additive.

The present invention further provides for the use of ionic liquids as a secondary dispersing additive in aqueous and solvent-borne pastes, inks, paints, coverings, coatings and coating materials.

The present invention additionally provides aqueous and solvent-borne pastes, inks, paints, coverings, coatings and coating materials comprising ionic liquids as a secondary dispersing additive.

The present invention also provides dispersants comprising a synergistic combination of conventional primary dispersants, and
 ionic liquids as secondary dispersants.

DETAILED DESCRIPTION OF THE INVENTION

The present invention, which discloses the use of ionic liquids as a dispersing additive for producing homogeneous and storage stable pastes, inks and paints, will now be described in greater detail.

The use of ionic liquids as dispersants brings about a clear improvement in the economics and the call for technologies which enjoy a positive ecotoxicological evaluation. The spectrum of universal paste usefulness is thereby expanded beyond proportion.

This is also evident from the fact that even pigment paste systems which were purely aqueous to date, or those which, although containing small amounts of solvent, were hitherto suitable only for coloring solvent-borne paints and inks, can now be made useful for coloring solvent-based problem paints and inks of this kind.

Figure 1:
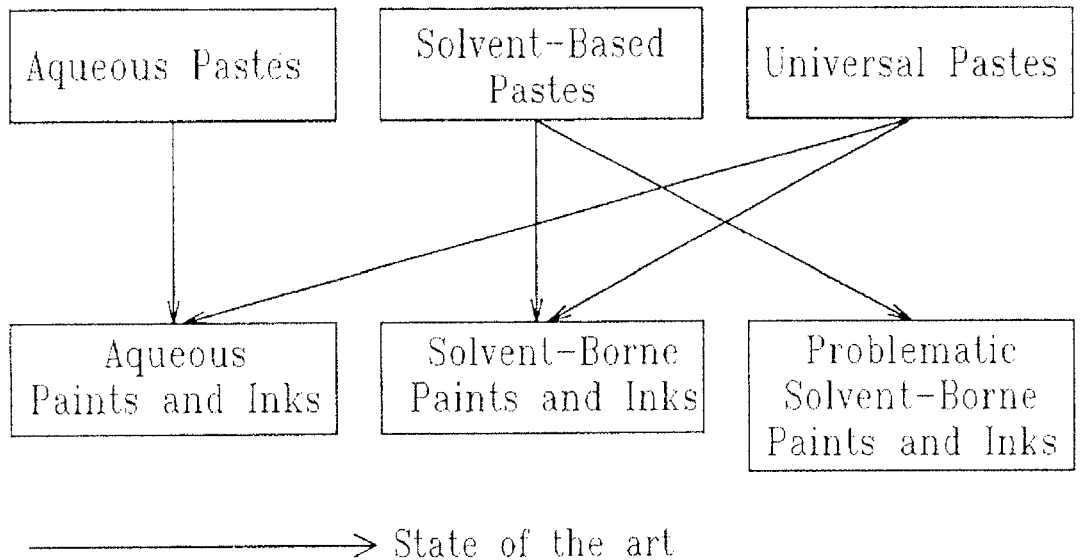
FIG. 1 is a scheme representing prior art color paste systems for coloring aqueous and solvent-borne systems.
Figure 2:
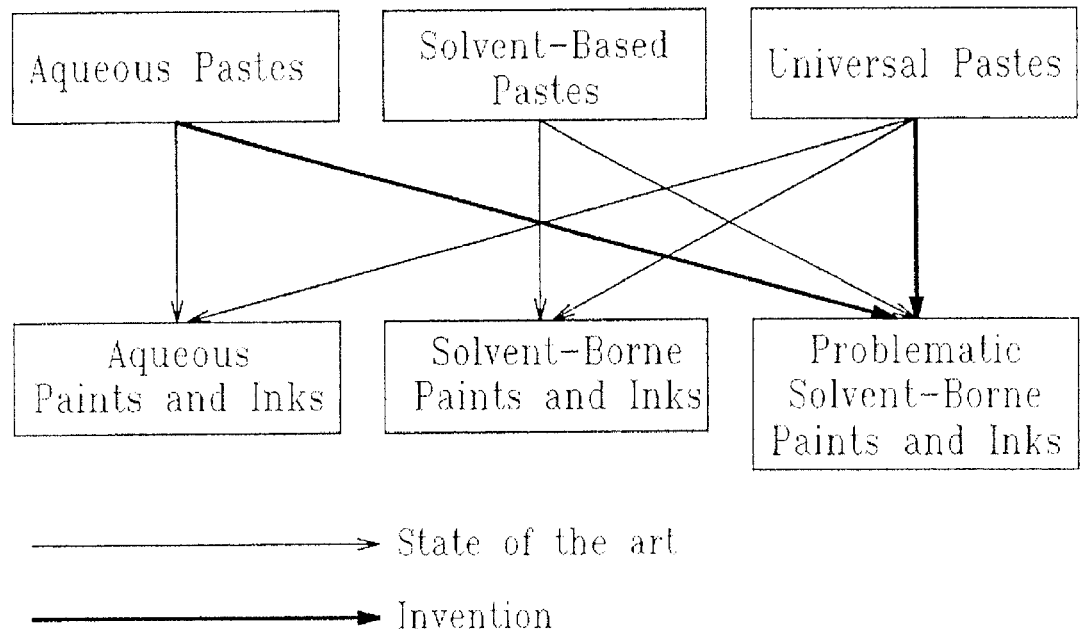
FIG. 2 is a scheme representing the invention in which ionic liquids are used for coloring paints, inks and coating materials.

FIG. 2, which may be referred herein as Scheme (2) illustrates the background to the inventive use of ionic liquids for coloring paints, inks and coating materials.

Ionic liquids are salts which generally melt at low temperature (<100° C.) and which represent an innovative class of liquids having a nonmolecular, ionic character. In contrast to conventional salt melts, which constitute high-melting, highly corrosive media of high viscosity, ionic liquids are already liquid and of relatively low viscosity at low temperatures (K. R. Seddon J. Chem. Technol. Biotechnol. 1997, 68, 351-356).

Ionic liquids consist in the majority of cases of anions such as, for example, halides, carboxylates, phosphates, sulfates, alkyl sulfates, sulfonates, alkylsulfonates, tetrafluoroborates or hexafluorophosphates in combination with, for example, substituted ammonium, phosphonium, pyridinium or imidazolium cations, the aforementioned anions and cations being a small selection from a large number of possible anions and cations and therefore making no claim to completeness and still less constituting any restriction.

The process of the present invention for using ionic liquids as a secondary dispersing additive for inks, paints and other coatings comprises using a synergistic combination of a) conventional primary dispersants and b) ionic liquids, the ionic liquids of the present invention are composed of at least one quaternary nitrogen and/or phosphorus compound and at least one anion and having a melting point of below about +250° C., preferably below about +150° C., and in particular below about +100° C.

The ionic liquids used with preference in the process of the invention are composed of at least one cation of the general formulae:

$$R^1R^2R^3R^4N^\oplus \tag{1}$$

$$R^1R^2N^\oplus\!=\!CR^3R^4 \tag{2}$$

$$R^1R^2R^3R^4P^\oplus \tag{3}$$

$$R^1R^2P^\oplus\!=\!CR^3R^4 \tag{4}$$

in which $R^1, R^2R^3, R^4$ are identical or different and are hydrogen, a linear or branched aliphatic hydrocarbon radical, with or without double bonds, having 1 to 30 carbon atoms, a cycloaliphatic hydrocarbon radical, with or without double bonds, having 5 to 40 carbon atoms, an aromatic hydrocarbon radical having 6 to 40 carbon atoms, an alkylaryl radical having 7 to 40 carbon atoms, a linear or branched aliphatic hydrocarbon radical, with or without double bonds, interrupted by one or more heteroatoms (oxygen, NH, NR' where R' is a $C_1$ to $C_{30}$ alkyl radical, with or without double bonds, especially —$CH_3$) and having 2 to 30 carbon atoms, a linear or branched aliphatic hydrocarbon radical, with or without double bonds, interrupted by one or more functionalities selected from the group consisting of —O—C(O)—, —(O)C—O—, —NH—C(O)—, —(O)C—NH, —($CH_3$)N—C (O)—, —(O)C—N($CH_3$)—, —S($O_2$)—O—, —O—S ($O_2$)—, —S($O_2$)—NH—, —NH—S($O_2$)—, —S($O_2$)—N ($CH_3$)—, and —N($CH_3$)—S($O_2$)—, and having 2 to 30 carbon atoms, a linear or branched, aliphatic or cycloaliphatic hydrocarbon radical, with or without double bonds, which is terminally functionalized by OH, OR', $NH_2$, N(H)R', or $N(R')_2$ (where R' is a $C_1$- to $C_{30}$-alkyl radical, with or without double bonds) and has 1 to 30 carbon atoms, or a polyether —$(R^5$—$O)_n$—$R^6$ of blockwise or random construction, where $R^5$ is a linear or branched hydrocarbon radical containing 2 to 4 carbon atoms, n is 1 to 100, preferably 2 to 60, and $R^6$ is hydrogen, a linear or branched aliphatic hydrocarbon radical, with or without double bonds, having 1 to 30 carbon atoms, a cycloaliphatic hydrocarbon radical, with or without double bonds, having 5 to 40 carbon atoms, an aromatic hydrocarbon radical having 6 to 40 carbon atoms, an alkylaryl radical having 7 to 40 carbon atoms, or a radical —C(O)—$R^7$, where $R^7$ is a linear or branched aliphatic hydrocarbon radical, with or without double bonds, having 1 to 30 carbon atoms, a cycloaliphatic hydrocarbon radical, with or without double bonds, having 5 to 40 carbon atoms, an aromatic hydrocarbon radical having 6 to 40 carbon atoms or an alkylaryl radical having 7 to 40 carbon atoms, and suitable cations further include ions which are derived from saturated or unsaturated cyclic compounds and also from aromatic compounds having, in each case, at least one trivalent nitrogen atom in a 4- to 10-membered, preferably 5- or 6-membered, heterocyclic ring, which may be substituted, if desired. Cations of this kind can be described in simplified form (that is, without specifying the precise position and number of the double bonds in the molecule) by the general formulae (5), (6) and (7) below, it is possible for the heterocyclic rings to include two or more heteroatoms if desired.

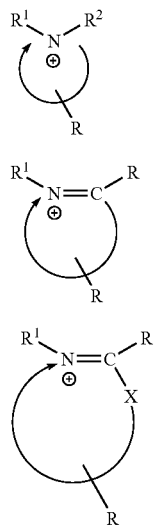

$R^1$ and $R^2$ are as defined above and

R is a hydrogen, a linear or branched aliphatic hydrocarbon radical, with or without double bonds, having 1 to 30 carbon atoms, a cycloaliphatic hydrocarbon radical with or without double bonds and having 5 to 40 carbon atoms, an aromatic hydrocarbon radical having 6 to 40 carbon atoms or an alkylaryl radical having 7 to 40 carbon atoms.

Examples of cyclic nitrogen compounds of the aforementioned kind are pyrrolidine, dihydropyrrole, pyrrole, imidazoline, oxazoline, oxazole, thiazoline, thiazole, isoxazole, isothiazole, indole, carbazole, piperidine, pyridine, the isomeric picolines and lutidines, quinoline and isoquinoline. The cyclic nitrogen compounds of the general formulae (5), (6) and (7) can be unsubstituted (R=H) or substituted one or more times by the radical R, where, in the case of multiple substitution by R, the individual radicals R can be different.

X is an oxygen atom, a sulfur atom or a substituted nitrogen atom (X=O, S, $NR^1$).

Further suitable cations include ions which are derived from saturated acyclic compounds, saturated or unsaturated cyclic compounds or from aromatic compounds having, in each case, more than one trivalent nitrogen atom in a 4- to 10-membered, preferably 5- or 6-membered heterocyclic ring. These compounds can be substituted, not only on the carbon atoms, but also on the nitrogen atoms. They may also be fused with optionally substituted benzene rings and/or cyclohexane rings, to form polynuclear structures. Examples of such compounds include: pyrazole, 3,5-dimethylpyrazole, imidazole, benzimidazole, N-methylimidazole, dihydropyrazole, pyrazolidine, pyridazine, pyrimidine, pyrazine, 2,3-, 2,5- and 2,6-dimethylpyrazine, cinnoline, phthalazine, quinazoline, phenazine and piperazine. Particularly cations deriving from imidazole and its alkyl and phenyl derivates, of the general formula (8), have proven suitable as a constituent of an ionic liquid.

Further suitable cations include ions which contain two nitrogen atoms and are depicted by the general formula (8)

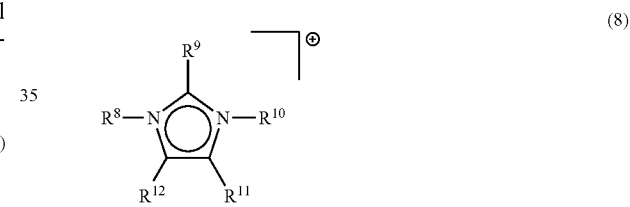

where $R^8,R^9,R^{10},R^{11},R^{12}$ are identical or different and are hydrogen, a linear or branched aliphatic hydrocarbon radical, with or without double bonds, having 1 to 30 carbon atoms, a cycloaliphatic hydrocarbon radical, with or without double bonds, having 5 to 40 carbon atoms, an aromatic hydrocarbon radical having 6 to 40 carbon atoms, an alkylaryl radical having 7 to 40 carbon atoms, a linear or branched aliphatic hydrocarbon radical, with or without double bonds, interrupted by one or more heteroatoms (oxygen, NH, NR' where R' is a $C_1$ to $C_{30}$ alkyl radical with or without double bonds) and having 1 to 30 carbon atoms, a linear or branched aliphatic hydrocarbon radical, with or without double bonds, interrupted by one or more functionalities selected from the group consisting of —O—C(O)—, —(O)C—O—, —NH—C(O)—, —(O)C—NH, —($CH_3$)N—C(O)—, —(O)C—N($CH_3$)—, —S($O_2$)—O—, —O—S($O_2$)—, —S($O_2$)—NH—, —NH—S($O_2$)—, —S($O_2$)—N($CH_3$)—, and —N($CH_3$)—S($O_2$)—, and having 1 to 30 carbon atoms, a linear or branched, aliphatic or cycloaliphatic hydrocarbon radical, with or without double bonds, which is terminally functionalized by OH, OR', $NH_2$, N(H)R', or $N(R')_2$, where R' is a $C_1$- to $C_{30}$-alkyl radical with or without double bonds, and has 1 to 30 carbon atoms, or a polyether —$(R^5$—$O)_n$—$R^6$ of blockwise or random construction, where $R^5$ is a hydrocarbon radical containing 2 to 4 carbon atoms, n is 1 to 100, and $R^6$ is hydrogen, a linear or branched aliphatic hydrocarbon radical, with or without double bonds, having 1 to 30 carbon atoms, a cycloaliphatic hydrocarbon radical, with or without double bonds, having 5 to 40 carbon atoms, an aromatic hydrocarbon radical having 6 to 40 carbon atoms, an alkylaryl radical having 7 to 40 carbon atoms, or a radical —C(O)—$R^7$, where $R^7$ is a linear or branched aliphatic hydrocarbon radical, with or without double bonds, having 1 to 30 carbon atoms, a cycloaliphatic hydrocarbon radical, with or without double bonds, having 5 to 40 carbon atoms, an aromatic hydrocarbon radical having 6 to 40 carbon atoms or an alkylaryl radical having 7 to 40 carbon atoms.

The ionic liquids used with preference in accordance with the present invention are composed of at least one of the aforementioned cations in combination with one anion in each case. Preferred anions are selected from the group—with no claim to completeness—of the halides, bis(perfluoroalkylsulfonyl)amides, alkyl and aryl tosylates, perfluoroalkyl tosylates, nitrates, sulfates, hydrogensulfates, alkyl and aryl sulfates, polyether sulfates and polyethersulfonates, perfluoroalkyl sulfates, sulfonates, alkyl and arylsulfonates, perfluorinated alkyl- and arylsulfonates, alkyl- and arylcarboxylates, perfluoroalkylcarboxylates, perchlorates, tetrachloroaluminates and saccharinates. Additionally, dicyanamide, tetrafluoroborate, hexafluorophosphate, polyether phosphates and phosphate are preferred anions.

The amount of added ionic liquid corresponds to a mass fraction in the range from 0.1% to 98%, preferably 0.1% to 20%, more preferably 0.3% to 5% by weight, based on the aqueous or solvent-borne pigment formulations, paints, inks, coating materials or coverings.

It is largely not critical whether the ionic liquids are added separately to the pastes, which preferably already contain the primary dispersants customary in this field, or to the paints, inks, coverings, coatings or coating materials, or whether beforehand synergistic mixtures of a) primary dispersant and ionic liquids as secondary dispersants are produced and are added in sufficient amount to one of the two components (pigment pastes or paints/inks/coverings/coating materials). The decisive factor ultimately is that the ready-to-use mixture comprises the two components (conventional primary dispersant+ionic liquid) in an amount which is sufficient to develop the synergistic effect.

Accordingly not only products which are already standard commercial products, especially pastes, but also new systems can be made universal.

The following examples are provided to illustrate the inventive use of ionic liquids. Specifically, and in order to demonstrate the surprising effect conventional ionic liquids were used in combination with aqueous paints formulated on the basis of comparative examples C1 to C3 or so called universal pastes comprising the primary dispersants C4 to C7, in order to color different kinds of solvent-borne paints of the Pliolite family. Table 1 characterizes the primary dispersants.

TABLE 1

Primary dispersants as comparative examples:

| | | |
|---|---|---|
| C1 | Acrylate-based dispersant in combination with fatty alcohol ethoxylate | Dispersants for dispersing in an aqueous | Tego Dispers ® 745 W |

TABLE 1-continued

Primary dispersants as comparative examples:

| | | |
|---|---|---|
| C2 | Styrene-maleic anhydride copolymer | environment | Tego Dispers ® 750 W |
| C3 | Acrylate-based dispersant | | Tego Dispers ® 720 W |
| C4 | Styrene-oxide-based polyether, nonionic | Dispersants for formulating | Tego Dispers ® 650 |
| C5 | Phosphorylated, styrene-oxide-based polyether | universal pastes | Tego Dispers ® 651 |
| C6 | Nonylphenol ethoxylate-9 EO, nonionic | | Berol ® 09 (Akzo Nobel) |
| C7 | Nonylphenol ethoxylate-9 EO, anionically modified | | Berol ® 733 (Akzo Nobel) |

The aforementioned additives were employed for preparing the pigment pastes set out in tables 2 and 3, with the corresponding formulas.

TABLE 2

Formulas for universal pastes:

| | Chromophtal ® Violet GA (Ciba) | Bayferrox ® 120 M (Bayer AG) | Heliogenblau ® L 7072 D (BASF AG) |
|---|---|---|---|
| Dispersing additive, 100% solids | 6.0 | 6.0 | 8.8 |
| Demineralized water | 63.9 | 21.9 | 46.1 |
| Wetting agent Tego ® Dispers 652 | | 1.5 | |
| Defoamer Tego ® Foamex 830 | 1.0 | 1.5 | 1.0 |
| Solvent 1,2-Propylene glycol | 9.0 | 9.0 | 9.0 |
| Pigment | 20.0 | 60.0 | 35.0 |
| Biocide Parmetol ® K 40 (Schülke & Mayr) | 0.1 | 0.1 | 0.1 |

TABLE 3

Formulas for aqueous pigment pastes (aqueous, completely solvent-free):

| | Chromophtal ® Violet GA (Ciba) | Bayferrox ® 120 M (Bayer AG) |
|---|---|---|
| Demineralized water | 59.9 | 32.9 |
| Dispersing additive, 100% solids | 9.0 | 6.0 |
| Defoamer Tego ® Foamex 830 | 1.0 | 1.0 |
| Pigment | 30.0 | 60.0 |
| Biocide Parmetol ® K 40 (Schülke & Mayr) | 0.1 | 0.1 |

The procedure for producing the pigment pastes set out above was always as follows:

stir in inorganic pigment, then disperse for 1 h with glass beads (1:1 volume/e.g., using BA-S 20K shaker from Lau GmbH), stir in organic pigment, then disperse for 2 h with glass beads (1:2 volume/e.g., using BA-S 20K shaker from Lau GmbH).

The aforementioned types of pigment, inorganic red iron oxide in the form of Bayferrox® 120 M (Bayer AG) and organic Chromophtal® Violet GA (Ciba) and organic Heliogenblau® L 7072 (Bayer AG), were chosen only by way of example.

In order to describe the pigments which were employed in principle in pigment pastes and whose application scope was extended significantly by the present invention a distinction should be made in principle between organic and inorganic pigments and mention should be made of the group of the carbon blacks.

As inorganic pigments consideration ought to be given to titanium dioxide, different modifications of iron oxide, spinel pigments and ultramarine pigments (H. Endriβ, Aktuelle anorganische Bunt-Pigmente, Vincentz, 1997).

For the group of the organic pigments mention may be made by way of example of the following (P. F. Gordon, P. Gregory, Organic Chemistry in Colour, Springer-Verlag, 1983; W. Herbst, K. Hunger, Industrial organic pigments, VCH, 1993):

different kinds of azo pigments, such as β-naphthol pigments, disazo pigments, Naphtol AS pigments, benzimidazolone pigments, isoindolinones or azo-metal complex pigments;

polycyclic pigments, such as phthalocyanine pigments, quinacridones, perylene pigments, dioxazines and thioindigo types, for example;

a large number of different kinds of organic pigments, such as diketopyrrolopyrroles or quinophthalones, for example.

Furthermore, water-based pastes of different types of carbon black are suitable, through the combined use of ionic liquids, for coloring Pliolite systems or other kinds of solvent-based paints and inks.

For the group of the fillers mention may be made, for example, of chalk talc, kaolins and other silicatic fillers.

Ionic liquids employed for the purposes of use in accordance with the present invention were the compounds IL 1 to IL 25, which should be regarded only as examples, with the invention not being restricted to them. A chemical characterization of the ionic liquids is given in table 4.

TABLE 4 with radicals designation for IL 1 to 25

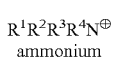
(1) $R^1R^2R^3R^4N^\oplus$ ammonium

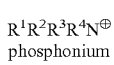
(3) $R^1R^2R^3R^4N^\oplus$ phosphonium

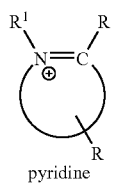
(6) pyridine

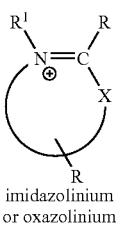
(7) imidazolinium or oxazolinium

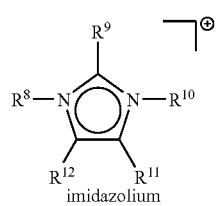
(8) imidazolium

| IL | Cation of the formulae (1) to (8) | $R^1$ | $R^2$ | $R^3$ [in the case of "polyalkoxy", distribution range (a to b)] | $R^4$ | X | R | Anion |
|---|---|---|---|---|---|---|---|---|
| 1 | (1) | tallowalkyl-amidoethyl | =$R^1$ | poly-(1-10)-propoxy | methyl | — | — | methyl sulfate |
| 2 | (1) | tallowalkyl-amidoethyl (hydrogenated) | =$R^1$ | poly-(1-10)-ethoxy | methyl | — | — | methyl sulfate |
| 3 | (1) | alkyl | =$R^3$ | poly(4-13)-ethoxy fatty | methyl | — | — | methyl sulfate |

TABLE 4-continued

| IL | Cation of the formulae (1) to (8) | R¹ | R² | R³ | R⁴ | X | R | Anion |
|---|---|---|---|---|---|---|---|---|
| 4 | (7) | methyl | — | acid ester oleylamido-ethyl | — | NR³ | nortallowalkyl | methyl sulfate |
| 5 | (7) | methyl | — | butyl | — | NR³ | phenyl | methyl sulfate |
| 6 | (7) | butyl | — | butyl | — | NR³ | phenyl | bromide |
| 7 | (7) | octyl | — | butyl | — | NR³ | phenyl | bromide |
| 8 | (8) | methyl | — | methyl | — | — | — | methyl sulfate |
| 9 | (8) | hexadecyl | methyl | hexadecyl | — | — | — | bromide |
| 10 | (8) | tetradecyl | methyl | tetradecyl | — | — | — | chloride |
| 11 | (6) mixture of picoline, lutidine and collidine isomers | methyl | — | — | — | — | methyl one or more times | methyl sulfate |
| 12 | (6) mixture of picoline, lutidine and collidine isomers | methyl | — | — | — | — | methyl one or more times | methyl sulfate |
| 13 | (7) | methyl | — | — | — | 0 | ethyl | methyl sulfate |
| 14 | (1) | C₁₂-C₁₆ alkyl | =R¹ | methyl | methyl | — | — | chloride |
| 15 | (1) | tallowalkyl (hydrogenated) | =R¹ | methyl | methyl | — | — | methyl sulfate |
| 16 | (1) | tallowalkyl (hydrogenated) | =R¹ | methyl | methyl | — | — | chloride |
| 17 | (3) | tetradecyl | hexyl | =R² | =R² | — | — | dicyanamide |
| 18 | (1) | cocoalkyl | poly(4-16)ethoxy | methyl | methyl | — | — | methyl sulfate |
| 19 | (1) | tallowalkyl | =R³ | poly(13-23) ethoxy | ethyl | — | — | ethyl sulfate |
| 20 | (1) | cocoalkyl | poly(4-16)ethoxy | methyl | methyl | — | — | chloride |
| 21 | (1) | ethyl | =R¹ | poly(4-13) propoxy | methyl | — | — | chloride |
| 22 | (1) | ethyl | =R¹ | poly(37-47) propoxy | methyl | — | — | chloride |
| 23 | (1) | ethyl | =R¹ | polyalkoxy =(36-45) propoxy (11-21) ethoxy | 2-hydroxyethyl | — | — | acetate |
| 24 | (1) | ethyl | =R¹ | polyalkoxy =(36-45) propoxy (7-15) ethoxy | 2-hydroxyethyl | — | — | phosphate |
| 25 | (1) | ricinoleyl-propylamido | methyl | =R² | =R² | — | — | methyl sulfate |

To test the technical properties of the ionic liquids claimed in accordance with the invention they were added to a mixture of problem white paint based on Pliolite and chromatic pigment paste (aqueous or universal) and evaluated by means of the following tests:

Rub-Out Test:

In order to make in particular the vertical floating of pigments in paint films visible and measurable it was possible to carry out the test known as the rub-out test For this test, the paint film, while still wet, though having already taken was rubbed with the finger or a brush. If the pigments have separated or were in highly flocculated condition, the mechanical operation of rubbing induced them into a homogeneous distribution again. The target shade of the homogeneous mixture was produced. From the difference in color relative to the unrubbed film the extent of the disruption was evident The rub-out effect obtained can be either positive or negative. A positive rub-out effect means that the color strength of the unrubbed film was lower than that of the rubbed film, possibly attributable to the floating of white pigment. The opposite situation produced a negative rub-out effect.

Determination of the Colorimetric Values:

The pigmented paints and inks drawn down onto cardboard charts (Leneta® chart) were measured using a calorimeter (X-Rite, SP 62-162, illuminant D65/10, X-Rite) in the form of L*a*b* values (brightness, undertone on the red/green scale, undertone on the yellow/blue scale).

If a pigment paste was used which was not suitable for the white paint to be colored, spontaneous flocculation occurred, although in other white paints the pigment paste allowed a completely unproblematic, deep coloration with the chromatic pigment present in the pigment paste. Nor was it possible to overcome spontaneous flocculation by adding further amounts of chromatic pigment paste; no color deepening occurred. An attempt to rub out the pigments in the paint after slight initial drying resulted generally in a severe difference in rub-out between rubbed and unrubbed area, which was unwanted. The present invention therefore ensured that aqueous pigment pastes or universal pastes provided deep coloring even to difficult solvent-borne paints such as Pliolite systems, for example. The contribution of the ionic liquids, as secondary dispersions, to suppressing the propensity toward flocculation can be forcefully demonstrated by much lower lightness (L*) and about (ΔE) values.

In order to demonstrate the surprising effect, an attempt was made to homogenize 25 g of white Pliolite paint with 0.5 g of organic or 1.0 g of inorganic pigment paste, using a squeegee. By adding 0.3 g of ionic liquid and homogenization, the effect claimed in accordance with the invention was observed on contrast charts after the system had been drawn down using a 150 μm applicator. The rub-out was carried out after 4 to 6 minutes. The concentration of 0.3 g of ionic liquid was a standard concentration used, with concentration-dependent effects supporting the claim made in accordance with the invention and therefore not being restricted to the aforementioned concentration.

For observing the effect in accordance with the invention, four standard commercial paint systems were used and three different chromatic pigments were formulated to pastes with the universal dispersant C 5 and employed for coloring.

The corresponding paints are characterized in table 5.

TABLE 5

Problem solvent-borne paint systems:

| Paint system | Chemical basis | Solvent | Appearance |
|---|---|---|---|
| Trugnard/F | styrene-acrylates or | white spirit | matt |
| ICI/UK | styrene-butadienes in | white spirit | glossy |
| Stormshield 1/UK | solution in a solvent, | white spirit | matt |
| Stormshield 2/UK | properties like those of alkyd resin | isoparaffin | matt |

Where pastes based on C 5 were used for the preparation, in accordance with the paste formulations specified in table 2, the rub-out values which resulted for the four abovementioned paint systems were those specified in table 6 below, which made it clear that none of the three color pastes used allowed satisfactory coloring of even only one of the paint systems. The values were, therefore, an illustration of the problem which was depicted schematically in scheme 1.

TABLE 6

Coloring of problem solvent-borne paints, with resultant ΔE values (pastes based on C 5):

| | Bayferrox ® 120 M (Bayer AG) | Chromophtal ® Violet GA (Ciba) | Heliogenblau ® L 7072 D (BASF AG) |
|---|---|---|---|
| Trugnard UK | 28.52 | 27.91 | 25.71 |
| ICI/F | 8.93 | 37.87 | 34.30 |
| Stormshield 1 | 9.14 | 11.76 | |
| Stormshield 2 | 27.67 | 33.73 | |

The effect claimed in accordance with the invention can be observed from the results in table 7 for Chromophtal® Violet GA and in table 8 for Bayferrox® 120 M.

TABLE 7

Chromophtal ® Violet GA (Ciba) + ionic liquids/hand mixing in Stormshield 2:

| Pastes based on the primary dispersing additives | | Pliolite + paste no IL | | Pliolite + paste IL 4 | | Pliolite + paste IL 15 | | Pliolite + paste IL 21 | |
|---|---|---|---|---|---|---|---|---|---|
| | | L* | dE | L* | dE | L* | dE | L* | dE |
| C1 | 745 W | 68.04 | 32.98 | 51.25 | 6.39 | 49.23 | 5.96 | 62.12 | 16.20 |
| C2 | 750 W | 78.63 | 31.51 | 54.60 | 5.08 | 70.30 | 20.69 | 63.73 | 18.01 |

TABLE 7-continued

Chromophtal ® Violet GA (Ciba) + ionic liquids/hand mixing in Stormshield 2:

| Pastes based on the primary dispersing additives | | Pliolite + paste no IL | | Pliolite + paste IL 4 | | Pliolite + paste IL 15 | | Pliolite + paste IL 21 | |
|---|---|---|---|---|---|---|---|---|---|
| | | L* | dE | L* | dE | L* | dE | L* | dE |
| C3 | 720 W | 80.48 | 9.61 | 55.19 | 10.04 | 51.12 | 8.54 | 74.89 | 10.18 |
| C4 | 650 | 51.46 | 7.94 | 49.97 | 6.28 | 48.47 | 4.89 | 62.68 | 14.57 |
| C5 | 651 | 67.42 | 33.29 | 54.50 | 13.61 | 56.96 | 19.76 | 69.24 | 29.14 |
| C6 | Berol 09 | 74.95 | 26.58 | 59.39 | 2.08 | 59.48 | 2.60 | 69.49 | 21.66 |
| C7 | Berol 733 | 70.86 | 38.58 | 52.39 | 9.32 | 54.5 | 15.89 | 64.44 | 20.95 |

TABLE 8

Bayferrox ® 120 M (Bayer AG) + ionic liquids/hand mixing in Stormshield 2:

| Pastes based on the primary dispersing additives | | Pliolite + paste no IL | | Pliolite + paste IL 4 | | Pliolite + paste IL 15 | | Pliolite + paste IL 21 | |
|---|---|---|---|---|---|---|---|---|---|
| | | L* | dE | L* | dE | L* | dE | L* | dE |
| C1 | 745 W | 77.33 | 29.31 | 59.24 | 1.60 | 58.28 | 0.67 | 65.01 | 10.94 |
| C2 | 750 W | 78.34 | 26.97 | 59.79 | 3.07 | 64.93 | 10.44 | 70.91 | 17.28 |
| C3 | 720 W | not possible to prepare a paste | | | | | | | |
| C4 | 650 | 75.28 | 27.96 | 58.70 | 2.92 | 58.85 | 2.32 | 70.10 | 19.24 |
| C5 | 651 | 78.55 | 30.61 | 58.85 | 3.44 | 59.43 | 3.00 | 64.70 | 12.49 |
| C6 | Berol 09 | 74.95 | 26.58 | 59.39 | 2.08 | 59.48 | 2.60 | 69.49 | 21.66 |
| C7 | Berol 733 | not possible to prepare a paste | | | | | | | |

Irrespective of whether coloring was carried out using aqueous pastes based on the primary dispersing additives C 1 to C 3 or universal dispersants based on C 4 to C 7 for the pastes, none of the violet or red pastes allowed the unproblematic coloring of the Stormshield 2 system. Deeply colored drawdowns (low L* values) without significant rub-outs (ΔE<<10) were possible only through the additional use of the three ionic liquids used (IL 4, IL 15 and IL 21).

Tables 9 and 10 list the results for the violet pastes and red pastes which include the universal dispersing additive C 5, as primary dispersing additive, and were then used for coloring in the critical coating system represented by Stormshield 2.

TABLE 9

Primary dispersant C 5 of the Chromophtal ® Violet GA paste (Ciba) with Stormshield 2, with and without ionic liquids:

| | L | a | b | dE |
|---|---|---|---|---|
| No IL | 71.16 | 2.72 | −13.84 | 33.73 |
| IL 1 | 54.17 | 15.84 | −32.85 | 4.53 |
| IL 2 | 54.24 | 14.99 | −32.01 | 5.04 |
| IL 3 | 54.39 | 15.50 | −32.35 | 5.16 |
| IL 4 | 54.00 | 16.20 | −32.82 | 5.93 |
| IL 5 | 62.68 | 7.46 | −22.07 | 21.05 |
| IL 6 | 61.80 | 7.82 | −23.22 | 14.22 |
| IL 7 | 62.22 | 7.80 | −23.10 | 15.34 |
| IL 8 | 57.81 | 12.88 | −28.69 | 12.80 |
| IL 9 | 67.91 | 6.26 | −19.01 | 25.83 |
| IL 10 | 69.43 | 6.19 | −19.36 | 23.72 |
| IL 11 | 64.02 | 8.89 | −22.83 | 20.26 |
| IL 12 | 71.36 | 4.59 | −15.83 | 30.24 |

TABLE 9-continued

Primary dispersant C 5 of the Chromophtal ® Violet GA paste (Ciba) with Stormshield 2, with and without ionic liquids:

|       | L     | a     | b      | dE    |
|-------|-------|-------|--------|-------|
| IL 13 | 62.53 | 9.71  | -24.43 | 18.52 |
| IL 14 | 61.65 | 8.26  | -23.8  | 13.25 |
| IL 15 | 55.22 | 14.28 | -31.18 | 7.99  |
| IL 16 | 55.06 | 12.29 | -28.82 | 11.00 |
| IL 17 | 62.50 | 9.37  | -24.29 | 15.45 |
| IL 18 | 68.16 | 3.93  | -16.54 | 24.86 |
| IL 19 | 70.10 | 3.83  | -15.90 | 25.83 |
| IL 20 | 72.66 | 3.12  | -14.15 | 29.04 |
| IL 21 | 69.24 | 1.80  | -14.24 | 29.14 |
| IL 22 | 68.37 | 1.94  | -15.03 | 28.74 |
| IL 23 | 65.29 | 3.27  | -17.28 | 25.33 |
| IL 24 | 68.81 | 2.01  | -14.99 | 28.67 |
| IL 25 | 60.95 | 7.85  | -23.06 | 17.47 |

TABLE 10

Primary dispersant C 5 of the Bayferrox ® 120 M pastes (Bayer AG) with Stormshield 2, with and without ionic liquids:

|       | L     | a     | b     | dE    |
|-------|-------|-------|-------|-------|
| No IL | 76.15 | 5.16  | -1.74 | 27.67 |
| IL 1  | 60.27 | 21.00 | 7.78  | 3.74  |
| IL 2  | 60.24 | 20.91 | 7.73  | 4.07  |
| IL 3  | 59.75 | 21.52 | 8.40  | 2.60  |
| IL 4  | 60.01 | 21.46 | 8.41  | 3.30  |
| IL 5  | 66.29 | 13.63 | 1.58  | 16.08 |
| IL 6  | 61.72 | 18.77 | 5.16  | 9.10  |
| IL 7  | 62.19 | 18.08 | 4.85  | 7.92  |
| IL 8  | 67.74 | 12.51 | 0.52  | 16.47 |
| IL 9  | 63.72 | 17.53 | 4.36  | 8.48  |
| IL 10 | 63.43 | 16.65 | 3.51  | 8.36  |
| IL 11 | 68.48 | 11.89 | 2.02  | 16.48 |
| IL 12 | 69.01 | 12.78 | 2.11  | 17.39 |
| IL 13 | 65.07 | 14.86 | 2.23  | 11.39 |
| IL 14 | 61.15 | 20.1  | 6.47  | 4.88  |
| IL 15 | 59.19 | 21.91 | 8.96  | 1.97  |
| IL 16 | 59.38 | 21.53 | 8.57  | 3.37  |
| IL 17 | 73.38 | 7.61  | -0.63 | 23.22 |
| IL 18 | 72.07 | 9.22  | 0.03  | 21.91 |
| IL 19 | 73.05 | 9.19  | 0.57  | 21.99 |
| IL 20 | 73.13 | 9.04  | 0.07  | 23.78 |
| IL 21 | 64.70 | 16.06 | 3.09  | 12.49 |
| IL 22 | 63.97 | 17.05 | 4.13  | 11.63 |
| IL 23 | 62.53 | 18.21 | 4.91  | 10.89 |
| IL 24 | 62.88 | 17.76 | 3.78  | 11.20 |
| IL 25 | 63.75 | 16.37 | 3.46  | 10.20 |

The blank samples of pigment pastes, with high L* values and dramatic ΔE values of more than 30 units, made it appear almost improbable that this critical paint system can be colored at all by means of water-based pastes.

All the more surprising was the effect claimed in accordance with the invention that can be achieved by means of the ionic liquids, and which was recognizable in each case from a reduction in the L* value and in the ΔE value.

In particular the ionic liquids IL 1, 2, 3, 4 and 15 were suitable for preventing flocculation of the violet aqueous pigment paste in the solvent-borne paint to such an extent that the systems were in fact technically realizable.

For the red paste the situation was even less complicated, since not only the ionic liquids suitable for Chromophtal® Violet GA but also further ionic liquids exhibit an effect which was extremely relevant from a technical standpoint.

While the present invention has been particularly shown and described with respect to preferred embodiments thereof, it will be understood by those skilled in the art that the foregoing and other changes in forms and details may be made without departing from the spirit and scope of the present invention It is therefore intended that the present invention not be limited to the exact forms and details described and illustrated, but fall within the scope of the appended claims.

What is claimed is:

1. A process for coloring pastes, inks, paints, coverings, coatings or coating materials comprising:
    providing an aqueous pigment paste including water, at least one pigment and a synergistic combination of dispersants including:
    a). a primary dispersant; and
    b). a secondary dispersant including at least one ionic liquid composed of at least one cation of the general formulae (1) to (4):

$$R^1R^2R^3R^4N^\oplus \tag{1}$$

$$R^1R^2N^\oplus{=}CR^3R^4 \tag{2}$$

$$R^1R^2R^3R^4P^\oplus \tag{3}$$

$$R^1R^2P^\oplus{=}CR^3R^4 \tag{4}$$

in which $R^1, R^2, R^3, R^4$ are identical or different and are hydrogen, a linear or branched aliphatic hydrocarbon radical with or without double bonds and having 1 to 30 carbon atoms, a cycloaliphatic hydrocarbon radical with or without double bonds and having 5 to 40 carbon atoms, an aromatic hydrocarbon radical having 6 to 40 carbon atoms, an alkylaryl radical having 7 to 40 carbon atoms, a linear or branched aliphatic hydrocarbon radical with or without double bonds interrupted by one or more heteroatoms and having 2 to 30 carbon atoms, a linear or branched aliphatic hydrocarbon radical with or without double bonds interrupted by one or more functionalities selected from the group consisting of —O—C(O)—, —(O)C—O—, —NH—C(O)—, —(O)C—NH, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)—, and —N(CH$_3$)—S(O$_2$)— and having 2 to 30 carbon atoms, a linear or branched, aliphatic or cycloaliphatic hydrocarbon radical with or without double bonds which is terminally functionalized by OH, OR', NH$_2$, N(H)R', or N(R')$_2$, where R' is a C$_1$- to C$_{30}$-alkyl radical with or without double bonds and has 1 to 30 carbon atoms, or a polyether —(R$^5$—O)$_n$—R$^6$ of blockwise or random construction,
    where
    R$^5$ is a linear or branched hydrocarbon radical containing 2 to 4 carbon atoms,
    n is 1 to 100, and
    R$^6$ hydrogen, a linear or branched aliphatic hydrocarbon radical with or without double bonds and having 1 to 30 carbon atoms, a cycloaliphatic hydrocarbon radical with or without double bonds and having 5 to 40 carbon atoms, an aromatic hydrocarbon radical having 6 to 40 carbon atoms, an alkylaryl radical having 7 to 40 carbon atoms, or a radical —C(O)—R$^7$, where
    R$^7$ is a linear or branched aliphatic hydrocarbon radical with or without double bonds and having 1 to 30 carbon atoms, a cycloaliphatic hydrocarbon radical with or without double bonds and having 5 to 40 carbon atoms, an aromatic hydrocarbon radical having 6 to 40 carbon atoms or an alkylaryl radical having 7 to 40 carbon atoms.

2. The process as claimed in claim 1 wherein said at least one cation is derived from saturated or unsaturated cyclic compounds and also from aromatic compounds having at least one trivalent nitrogen atom in a 4- to 10-membered heterocyclic ring of the general formulae (5), (6) and (7)

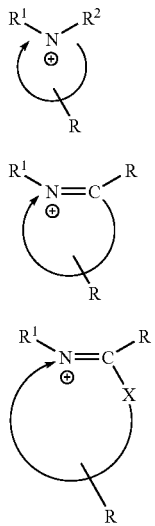

and where

R$^1$ and R$^2$ are as defined above,

R can be a hydrogen, a linear or branched aliphatic hydrocarbon radical with or without double bonds and having 1 to 30 carbon atoms, a cycloaliphatic hydrocarbon radical with or without double bonds and having 5 to 40 carbon atoms, an aromatic hydrocarbon radical having 6 to 40 carbon atoms or an alkylaryl radical having 7 to 40 carbon atoms, and X can be an oxygen atom, a sulfur atom or a substituted nitrogen atom.

3. The process as claimed in claim 2, wherein said at least one cation is a structure of general formula (8)

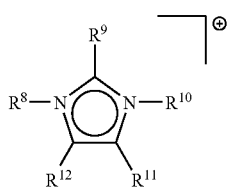

in which

R$^8$,R$^9$,R$^{10}$,R$^{11}$,R$^{12}$ are identical or different and are hydrogen, a linear or branched aliphatic hydrocarbon radical with or without double bonds and having 1 to 30 carbon atoms, a cycloaliphatic hydrocarbon radical with or without double bonds and having 5 to 40 carbon atoms, an aromatic hydrocarbon radical having 6 to 40 carbon atoms, an alkylaryl radical having 7 to 40 carbon atoms, a linear or branched aliphatic hydrocarbon radical with or without double bonds interrupted by one or more heteroatoms and having 1 to 30 carbon atoms, a linear or branched aliphatic hydrocarbon radical with or without double bonds interrupted by one or more functionalities selected from the group consisting of —O—C(O)—, —(O)C—O—, —NH—C(O)—, —(O)C—NH, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)—, and —N(CH$_3$)—S(O$_2$)— and having 1 to 30 carbon atoms, a linear or branched, aliphatic or cycloaliphatic hydrocarbon radical with or without double bonds which is terminally functionalized by OH, OR', NH$_2$, N(H)R', or N(R')$_2$ where R' is a C$_1$- to C$_{30}$-alkyl radical with or without double bonds and has 1 to 30 carbon atoms, or a polyether —(R$^5$—O)$_n$—R$^6$ of blockwise or random construction, where R$^5$ is a hydrocarbon radical containing 2 to 4 carbon atoms, n is 1 to 100 and R$^6$ is hydrogen, a linear or branched aliphatic hydrocarbon radical with or without double bonds and having 1 to 30 carbon atoms, a cycloaliphatic hydrocarbon radical with or without double bonds and having 5 to 40 carbon atoms, an aromatic hydrocarbon radical having 6 to 40 carbon atoms, an alkylaryl radical having 7 to 40 carbon atoms, or a radical —C(O)—R$^7$, where R$^7$ is a linear or branched aliphatic hydrocarbon radical with or without double bonds and having 1 to 30 carbon atoms, a cycloaliphatic hydrocarbon radical with or without double bonds and having 5 to 40 carbon atoms, an aromatic hydrocarbon radical having 6 to 40 carbon atoms or an alkylaryl radical having 7 to 40 carbon atoms.

4. The process as claimed in claim 1, wherein the at least one ionic liquid includes an anion selected from the group consisting of halides, bis(perfluoroalkylsulfonyl)amides, alkyl and aryl tosylates, perfluoroalkyl tosylates, nitrates, sulfates, hydrogensulfates, alkyl and aryl sulfates, polyether sulfates and polyethersulfonates, perfluoroalkyl sulfates, sulfonates, alkyl and arylsulfonates, perfluorinated alkyl- and arylsulfonates, alkyl- and arylcarboxylates, perfluoroalkylcarboxylates, perchlorates, tetrachloro-aluminates and saccharinates.

5. The process as claimed in claim 4, wherein said anion is an anion of dicyanamide, tetrafluoroborate, hexafluorophosphate, phosphate or polyether phosphates.

6. The process as claimed in claim 4, wherein said anion is an alkyl sulfate.

7. The process as claimed in claim 1, wherein said secondary dispersant includes mixtures of two or more of said ionic liquids each in combination with at least one anion.

8. The process as claimed in claim 1, wherein the at least one ionic liquid is present in an amount within the range from 0.1% to 98%, by weight, based on the total formulation.

9. The process as claimed in claim 8, wherein said at least one ionic liquid is present in an amount from 0.1% to 20%.

10. The process as claimed in claim 8, wherein said at least one ionic liquid is present in an amount 0.3% to 5%.

11. An aqueous or solvent-borne paste, ink, paint, covering, coating or coating material comprising an aqueous pigment paste including water, at least one pigment and a synergistic combination of dispersants including:

a). a primary dispersant; and b). a secondary dispersant including at least one ionic liquid composed of at least one cation of the general formulae (1) to (4):

 (1)

 (2)

 (3)

 (4)

in which $R^1, R^2, R^3, R^4$ are identical or different and are hydrogen, a linear or branched aliphatic hydrocarbon radical with or without double bonds and having 1 to 30 carbon atoms, a cycloaliphatic hydrocarbon radical with or without double bonds and having 5 to 40 carbon atoms, an aromatic hydrocarbon radical having 6 to 40 carbon atoms, an alkylaryl radical having 7 to 40 carbon atoms, a linear or branched aliphatic hydrocarbon radical with or without double bonds interrupted by one or more heteroatoms and having 2 to 30 carbon atoms, a linear or branched aliphatic hydrocarbon radical with or without double bonds interrupted by one or more functionalities selected from the group consisting of —O—C(O)—, —(O)C—O—, —NH—C(O)—, —(O)C—NH, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)—, and —N(CH$_3$)—S(O$_2$)— and having 2 to 30 carbon atoms, a linear or branched, aliphatic or cycloaliphatic hydrocarbon radical with or without double bonds which is terminally functionalized by OH, OR', NH$_2$, N(H)R', or N(R')$_2$, where R' is a C$_1$- to C$_{30}$-alkyl radical with or without double bonds and has 1 to 30 carbon atoms, or a polyether —(R$^5$—O)$_n$—R$^6$ of blockwise or random construction, where $R^5$ is a linear or branched hydrocarbon radical containing 2 to 4 carbon atoms, n is 1 to 100, and $R^6$ is hydrogen, a linear or branched aliphatic hydrocarbon radical with or without double bonds and having 1 to 30 carbon atoms, a cycloaliphatic hydrocarbon radical with or without double bonds and having 5 to 40 carbon atoms, an aromatic hydrocarbon radical having 6 to 40 carbon atoms, an alkylaryl radical having 7 to 40 carbon atoms, or a radical —C(O)—R$^7$, where R$^7$ is a linear or branched aliphatic hydrocarbon radical with or without double bonds and having 1 to 30 carbon atoms, a cycloaliphatic hydrocarbon radical with or without double bonds and having 5 to 40 carbon atoms, an aromatic hydrocarbon radical having 6 to 40 carbon atoms or an alkylaryl radical having 7 to 40 carbon atoms.

12. The method as claimed in claim 1, wherein said providing includes adding said at least one ionic liquid to a mixture of said aqueous pigment paste and said primary dispersant.

13. The method as claimed in claim 1, wherein said providing includes adding said combination of dispersants including said primary dispersant and said at least one ionic liquid to said aqueous pigment paste.

* * * * *